June 23, 1936.  G. DYKSTRA  2,045,128

MOTOR VEHICLE AND WINDSHIELD CLEANER THEREFOR

Filed Sept. 2, 1932  3 Sheets-Sheet 1

Inventor
George Dykstra
By Bean + Brooks, Attorneys

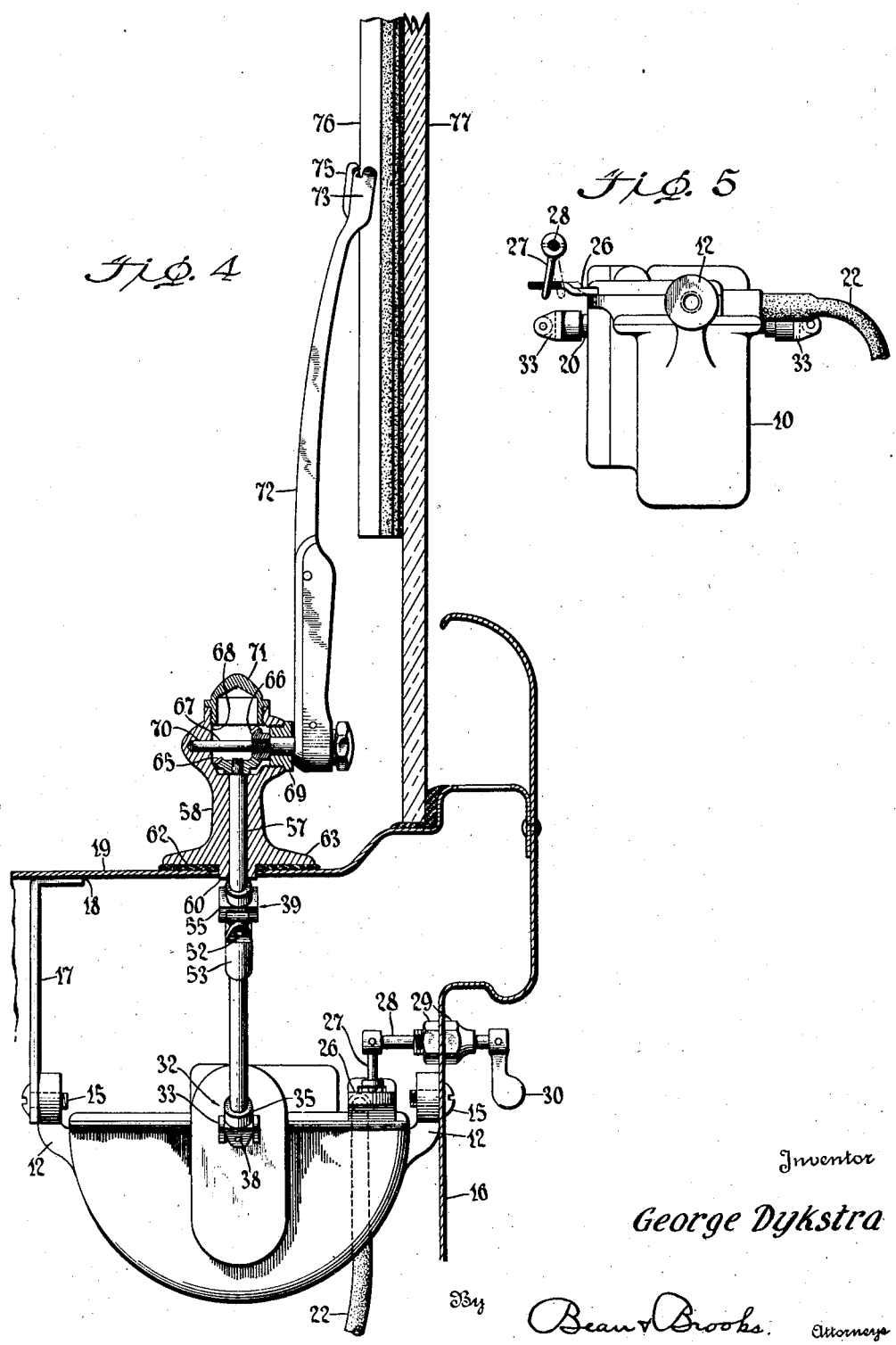

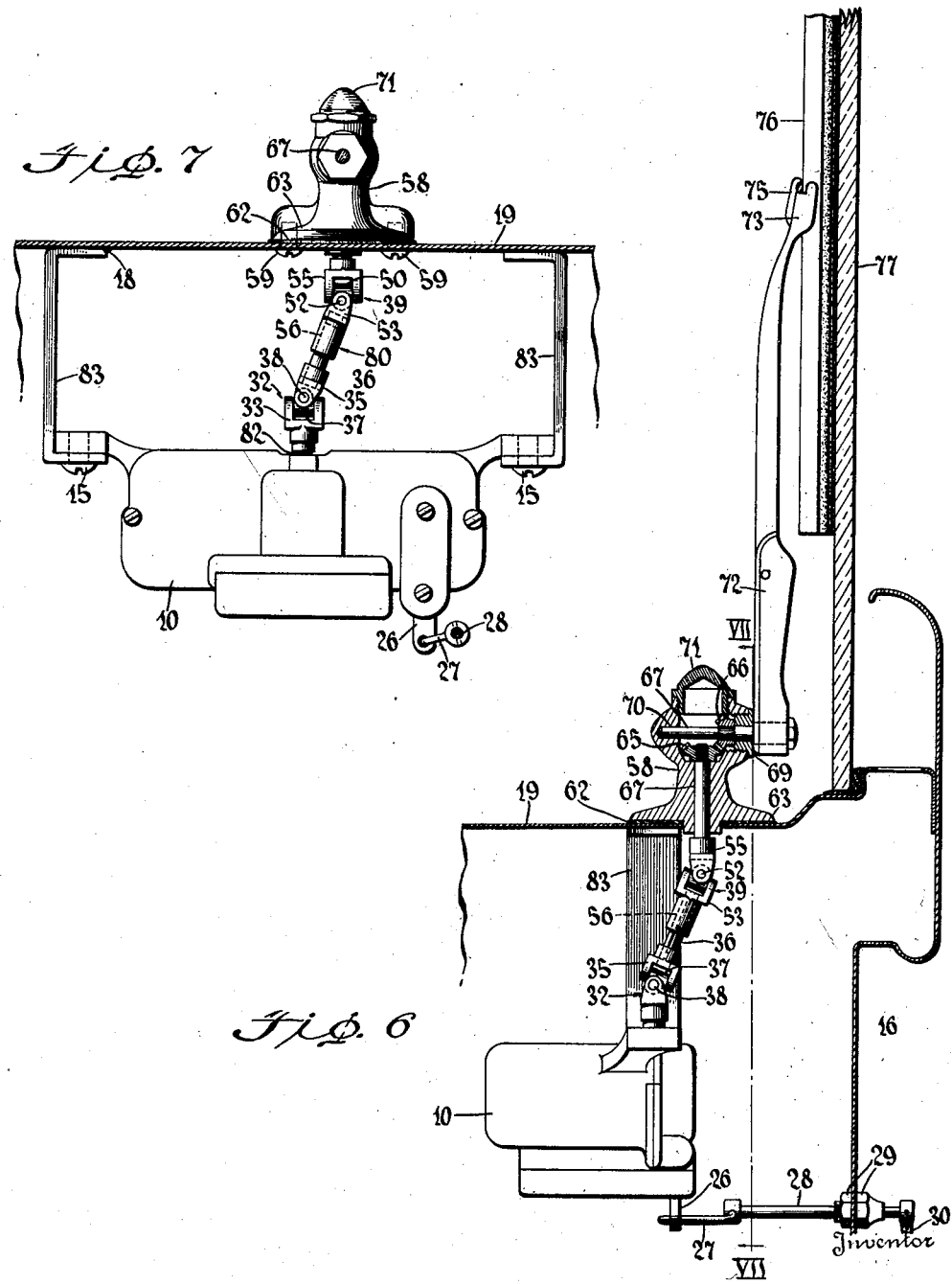

Patented June 23, 1936

2,045,128

UNITED STATES PATENT OFFICE 2,045,128

MOTOR VEHICLE AND WINDSHIELD CLEANER THEREFOR

George Dykstra, Buffalo, N. Y., assignor to Trico Products Corporation, Buffalo, N. Y.

Application September 2, 1932, Serial No. 631,564

1 Claim. (Cl. 15—255)

This invention relates to the mounting of automatic windshield cleaners upon motor vehicles and it has particular relation to means for the association of the windshield cleaner relative to the construction of the motor vehicle.

One object of the invention is to correlate the construction of a windshield cleaner and the elements of an automotive vehicle in such manner that the cleaner motor may be mounted in a position offset from the location of the wiping blade and without respect to the alignment of the motor and blade element or wiping arm of the cleaner.

Another object of the invention is to provide a construction for mounting a windshield cleaner upon the cowl of a motor vehicle adjacent the windshield thereof, and to provide universal shafting or like connections between the wiping element and cleaner motor whereby the motor may be mounted in any position relative to the position of the wiper blade.

In the drawings:

Fig. 4 is a cross-section taken substantially along the line IV—IV of Fig. 3 and illustrating portions of the windshield cleaner in side elevation;

Fig. 5 is a rear elevation of the cleaner motor;

Fig. 6 is a fragmentary cross-section illustrating a single wiper type of windshield cleaner and showing the motor and wiper elements in elevation; and Fig. 7 is a cross-section taken substantially along the line VII—VII of Fig. 6.

Figure 1:
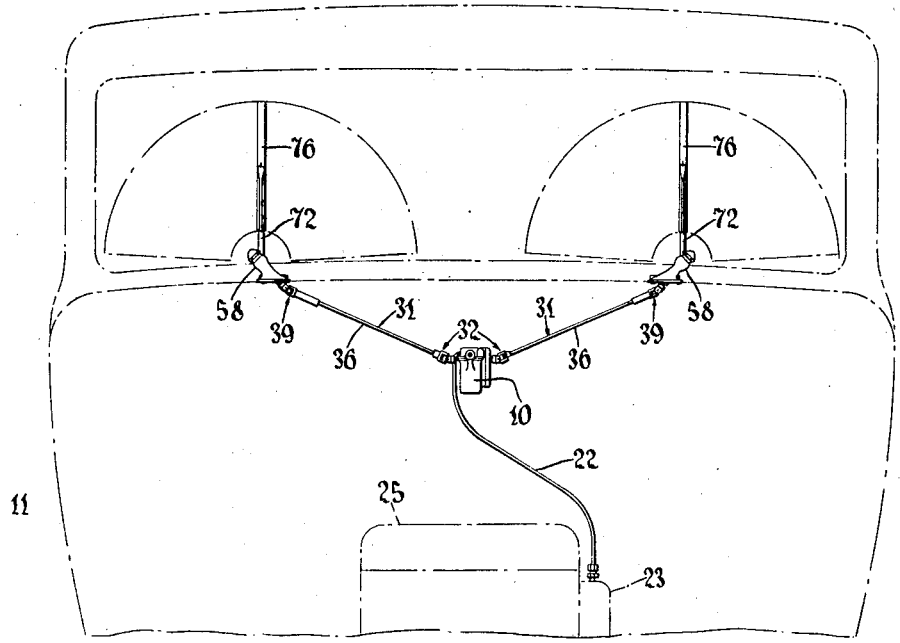
Fig. 1 is a front elevation of a duel type of windshield cleaner and a phantom representation of a portion of a vehicle upon which it is mounted.
Figure 2:
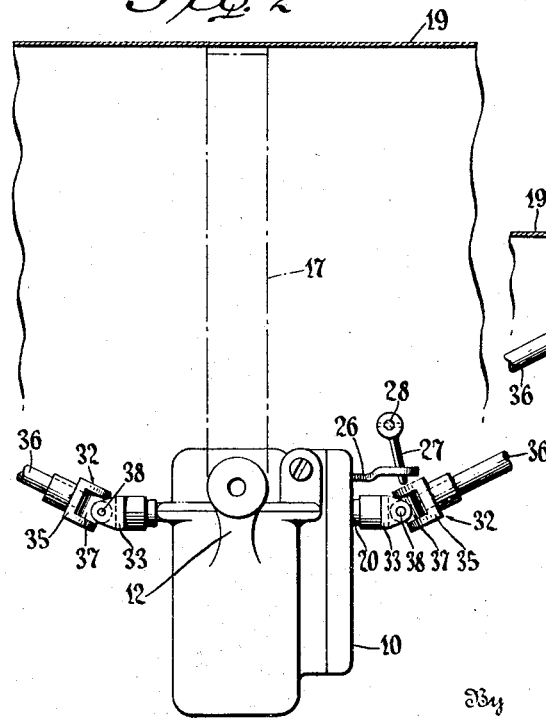
Fig. 2 is a fragmentary elevation of a windshield cleaner motor and portions of the vehicle body shown in cross-section.
Figure 3:
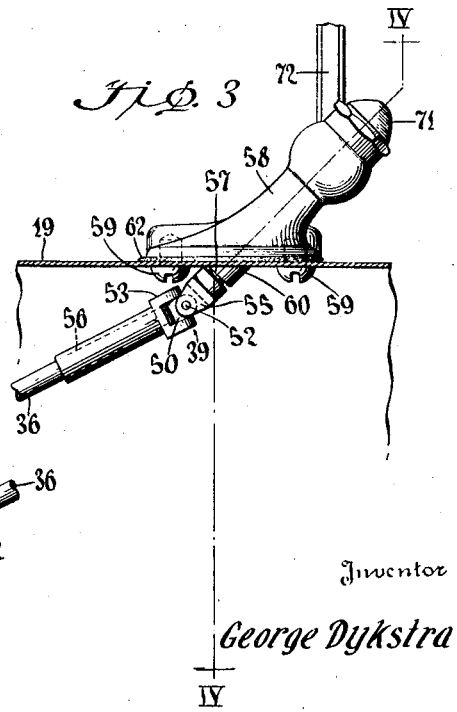
Fig. 3 is a fragmentary elevation of a joint and rod connection leading from the cleaner motor to a windshield wiper.

Referring to Figs. 1 to 5, a windshield cleaner motor 10 is mounted upon a vehicle body 11 by means of ears 12 having conventional positive connections 15 to a vehicle dash board 16 and to a bracket 17, the latter of which is welded or otherwise firmly secured, as indicated at 18, to the lower surface of a cowl portion 19 of the vehicle.

Opposite ends of an oscillatory shaft 20 of the cleaner motor 10 extend from opposite sides of the motor and the shaft is arranged horizontally and transversely of the longitudinal axis of the vehicle. This shaft is oscillated in a conventional manner by means of differential fluid pressure provided by exhausting air alternately from opposite sides of the motor through a tube 22 that is connected to the motor and to the suction side of an intake manifold 23 of an internal combustion engine 25 mounted in the vehicle. A valve mechanism 26 for controlling the suction in the cleaner motor is engaged by a finger 27 extending integrally and angularly from a rod 28 that is rotatably mounted in bearing elements 29 carried in clamping relation on opposite side portions of the dash 16 adjacent the cleaner motor mounting. At the end of the rod 28 opposite the finger 27 a handle 30 is provided to facilitate manual actuation of the valve mechanism 26.

Each end of the shaft 20 is provided with a flexible shafting unit 31 connected for direct operation by the cleaner motor. Each shafting unit comprises a universal flexible coupling 32 that includes bifurcated knuckles 33 and 35 rigidly connected to the end of the shaft 20 and to the inner end of a rod 36, respectively, and having an intermediate pivotal block portion 37 pivoted thereto by means of pins 38. These pins are arranged substantially at right angles to each other in the block and in slightly spaced relation.

At the end of each rod 36 opposite the coupling 32, another universal flexible coupling 39 is provided having a block 50 connected by means of pins 52 to a pair of knuckles 53 and 55 in the same manner as the other knuckles previously described. However, the knuckle 53 has a spline connection 56 to the rod 36 to provide for slight longitudinal play of the rod between the coupling 32 and 39. One end of a rod section 57 is rigidly connected to the knuckle 39 and its intermediate portion is journalled in an inclined bearing post 58 mounted upon the top of the cowl and secured thereto by means of suitable fasteners 59, such as screws. It will be observed that the posts are inclined substantially in opposite directions from the upper surface of the cowl. A lug 60 formed substantially axially upon each post 58 extends through the cowl and through a cushioning pad or plate 62 surrounding the lug and disposed between a base flange 63 of the post and the cowl.

A bevel gear 65 is rigidly mounted upon the end of each rod section 57 opposite the knuckle 39 and meshes with a similar bevel gear 66 that is rigidly mounted intermediately upon a horizontal wiper actuating shaft 67. The upper portion of the post is recessed to form a cavity 68 for receiving the bevel gears. A bearing plug 69 is threaded into the recessed portion of the post for rotatably receiving an intermediate portion of the shaft 67 and the inner end of this shaft is journalled in an opening 70 of the post. A suitable removable cap 71 is threaded into the upper portion of the cavity 68 and provides for access to the gears for lubricating or inspecting them. The gear 65 abuts the wall of the cavity 67 and the gear 67 abuts the inner surface of the plug 69.

One end of a windshield wiper arm 72 is non-rotatably secured to the outer end of the shaft 67 and the other end of the arm is provided with a flanged head 73 for loosely receiving a clip 75 of the wiper blade 76.

Rotary oscillatory movement of the motor shaft 20 is transmitted through the universal connections of the flexible shafting 31 to the arm 72 which is oscillated across the surface of a windshield 77. It will be noted that the outer end or head 73 of the wiper arm extends upwardly from the post 58 and hence, the wiper stroke is directly primarily downwardly from the intermediate position of the wiper blade as illustrated in Fig. 1.

In the form of the invention shown in Figs. 6 and 7, only one unit of flexible shafting 80 is provided for connection to one end of a cleaner motor shaft 82 and a pair of brackets 83 is provided for securing the cleaner motor to the motor vehicle cowl instead of one bracket 17 and the direct connection 15 previously described. Since the remaining elements are constructed and operated in substantially the same manner as the flexible shafting units 31, like numerals are employed to designate the corresponding parts and a repetition of the description is not necessary. Inasmuch as only a single wiper unit is employed in the arrangement shown in Figs. 6 and 7 the cleaner motor can be arranged closely to the wiper arm 72 and hence the flexible shafting unit is shorter than that shown in the Figs. 1 to 5. With this exception the constructions are approximately the same for each flexible shafting unit shown in the drawings.

By arranging the flexible shafting unit in the manner described the posts 58 can be mounted upon the surfaces of the cowl materially out of alignment with the mounting of the cleaner motor and hence these posts can be so correlated with the stream line contour of the vehicle as to position the wiper blade at the desired location with respect to the windshield. Since the modern tendency toward the stream lined construction has limited the space for mounting cleaner motors above the vehicle windshield, the construction described is peculiarly adapted for use in conjunction with the streamlining of the advanced designs of modern automobiles. If desirable the posts 58 can be constructed of highly polished metal in such form or design as to be in harmony with the remainder of the vehicle and may even serve as ornamental additions to the vehicle body. Moreover, there is considerable advantage in providing wiper blades in the relation shown wherein each blade moves in a downward direction from its mean position, that is, the position shown in Fig. 1, and hence the foreign matter, such as snow or other moisture, which is being forced downwardly at the end of each stroke, has a tendency to fall away from the cleaned surface of the windshield.

Although only the preferred forms of the invention have been shown and described in detail, it will be apparent to those skilled in the art that the invention is not so limited, but that various changes may be made therein without departing from the spirit of the invention or from the scope of the appended claim.

What is claimed is:

In an automotive vehicle having a cowl and windshield, a cleaner motor having means for supporting it beneath the cowl, a rocker shaft in the cleaner motor having its ends extending from opposite sides of the motor, a flexible shafting unit connected to each end of said shaft for rocking action therewith, a pair of windshield wiper arms disposed adjacent the windshield and cowl, a pair of supports mounted upon the cowl, and means carried by the supports and connecting the flexible shafting units to the wiper arms, respectively, for transmitting power from the motor through the shafting units to the wiper arms.

GEORGE DYKSTRA.